United States Patent
Reuter

(10) Patent No.: US 9,959,882 B2
(45) Date of Patent: May 1, 2018

(54) IN-CAR COMMUNICATION HOWLING PREVENTION

(71) Applicant: Continental Automotive Systems, Inc., Auburn Hills, MI (US)

(72) Inventor: Mike Reuter, Park Ridge, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days. days.

(21) Appl. No.: 15/697,909

(22) Filed: Sep. 7, 2017

(65) Prior Publication Data

US 2018/0068672 A1    Mar. 8, 2018

Related U.S. Application Data

(60) Provisional application No. 62/385,043, filed on Sep. 8, 2016.

(51) Int. Cl.

| G10L 21/0208 | (2013.01) |
|---|---|
| H04M 9/08 | (2006.01) |
| H04R 3/12 | (2006.01) |
| H04R 27/00 | (2006.01) |
| H04R 3/00 | (2006.01) |

(52) U.S. Cl.
CPC ......... *G10L 21/0208* (2013.01); *H04M 9/082* (2013.01); *H04R 3/005* (2013.01); *H04R 3/12* (2013.01); *H04R 27/00* (2013.01); *G10L 2021/02082* (2013.01); *H04R 2410/05* (2013.01); *H04R 2499/13* (2013.01)

(58) Field of Classification Search
CPC ...... G10L 21/0208; G10L 2021/02082; H04M 9/082; H04R 3/005; H04R 3/12; H04R 27/00; H04R 2410/05; H04R 2499/13

USPC .......................................................... 381/86
See application file for complete search history.

(56) References Cited

U.S. PATENT DOCUMENTS

2014/0294198 A1    10/2014    Hall et al.

FOREIGN PATENT DOCUMENTS

| EP | 0843502 A1 | 5/1998 |
|---|---|---|
| EP | 0903726 A2 | 3/1999 |
| EP | 2018034 A1 | 1/2009 |
| EP | 2615853 A2 | 7/2013 |
| EP | 2978242 A1 | 1/2016 |
| WO | 02/32356 A1 | 4/2002 |
| WO | 2009/138754 A1 | 11/2009 |

OTHER PUBLICATIONS

Search Report dated Nov. 18, 2016, from corresponding GB Patent Application No. GB1617015.1.
International Search Report and Written Opinion dated Oct. 13, 2017 from corresponding International Patent Application No. PCT/US2017/049148.

*Primary Examiner* — David Ton

(57) ABSTRACT

Howling or oscillation in an in-vehicle communications system is prevented when the speaker gain or microphone gain is detected as giving rise to a loop gain equal to or greater than one for a particular frequency or band of frequencies or when the rate of gain of a frequency or band of frequencies increases at a rate that indicating howling will occur. Howling is prevented and not just stopped or suppressed, by adjusting the gain of all frequencies prior to the howling actually starting.

5 Claims, 4 Drawing Sheets

IN-CAR COMMUNICATION HOWLING PREVENTION

BACKGROUND

An in-vehicle or in-car communication system is a feature offered on some vehicles, which uses existing hands-free audio equipment to provide what is essentially a small "public address" system between zones in the cabin of a vehicle. As shown in FIG. 1, a motor vehicle 102 having an interior or cabin space identified by reference numeral 104, enables rear seat passengers 110 and 112 to hear the passengers 106, 108 in the front of the vehicle 102. The speech from passengers 106, 108 in the front of the passenger compartment or interior 104 is "picked up" by microphones 114 and 116 that are coupled to an amplifier 118. The amplified speech is processed to remove noise and then provided to rear seat passengers 110 and 112 through one or more loudspeakers 126.

More specifically, audio frequency signals picked up by the microphones 114 and 116 are provided to a single or multi-microphone amplifier 118. The audio-frequency signals from the amplifier 118 are provided to a noise suppression processor 120. An echo canceller 122 removes audio frequencies detected by the microphones 114 and 116 that were output from one of the loudspeakers 126 located inside the vehicle's interior 104. A gain controllable amplifier 124 amplifies or magnifies the noise suppressed and echo cancelled audio from the microphone amplifier 118 and provides those signals to the in-vehicle speakers 126.

A problem with the prior art in-vehicle communications systems, including the system 100 shown in FIG. 1, is the oscillation or "howling" that inevitably occurs as the gain of the amplifier 124 increases, and as the acoustic characteristics of the vehicle's interior 104 change. By way of example, the acoustic feedback provided between the speakers 126 and the microphones 114 and 116 will change as the contents of the vehicle's interior 104 changes. Clothing, packages, and even the number of occupants, will change the acoustic characteristics of the in-vehicle interior 104 and thus change the feedback of audio from the speakers 126 to the microphones 114 and 116.

In the prior art, the echo suppression 122 selectively reduces the gain or amplification provided by the amplifier 124 but only for relatively narrow audio frequency bands. Such "notch" filtering causes the speech produced output from the speakers 126 to be distorted and is sometimes unintelligible. The echo canceller removes echo over a broad band, but not enough in high volume conditions to prevent howling. An apparatus and method for preventing howling before it occurs would be an improvement over the prior art and would produce enhanced audio fidelity in an in-vehicle audio communications system.

DETAILED DESCRIPTION

Figure 1:
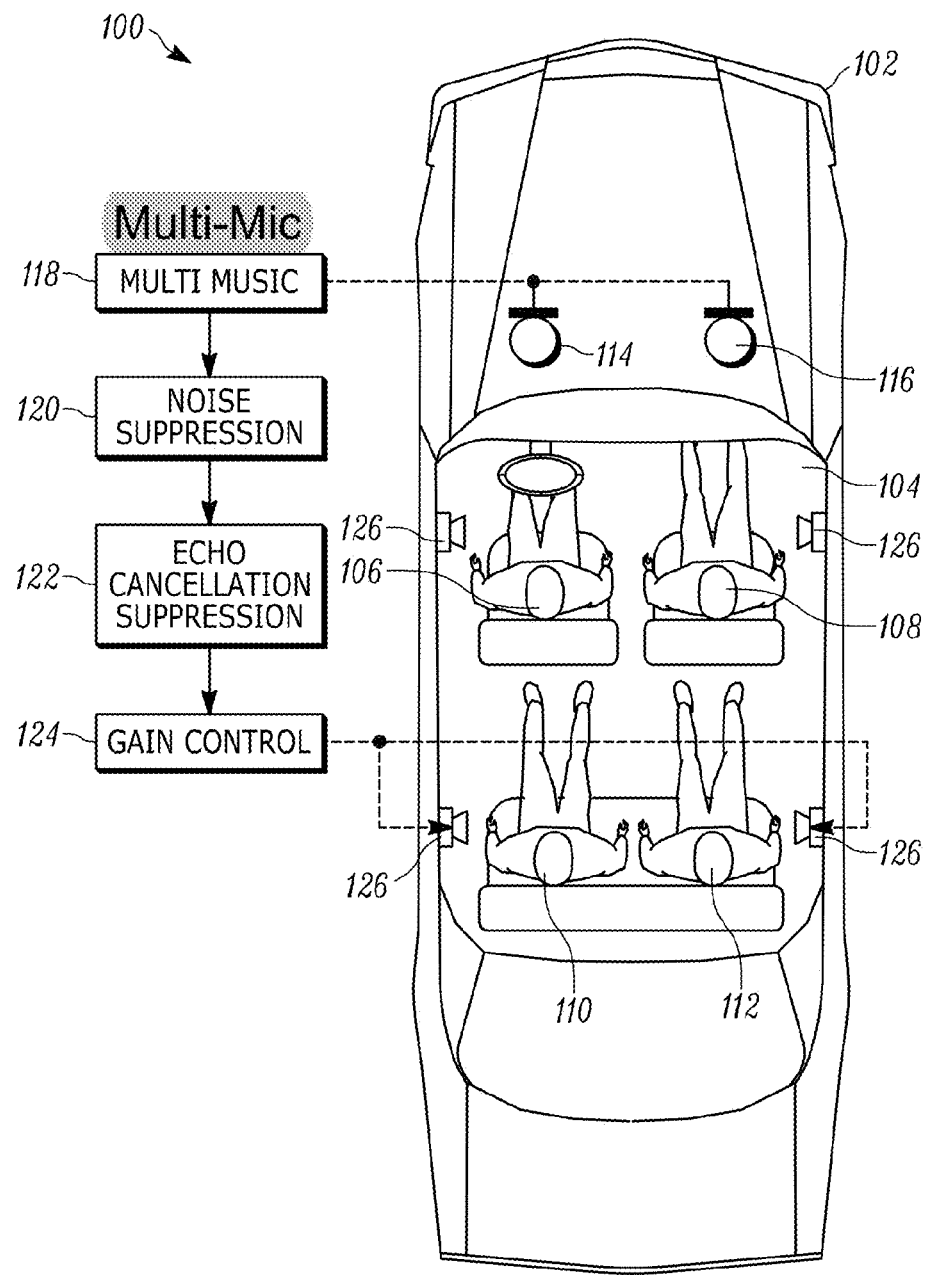
FIG. 1 is a block diagram of a prior art in-vehicle audio communications system.
Figure 2:
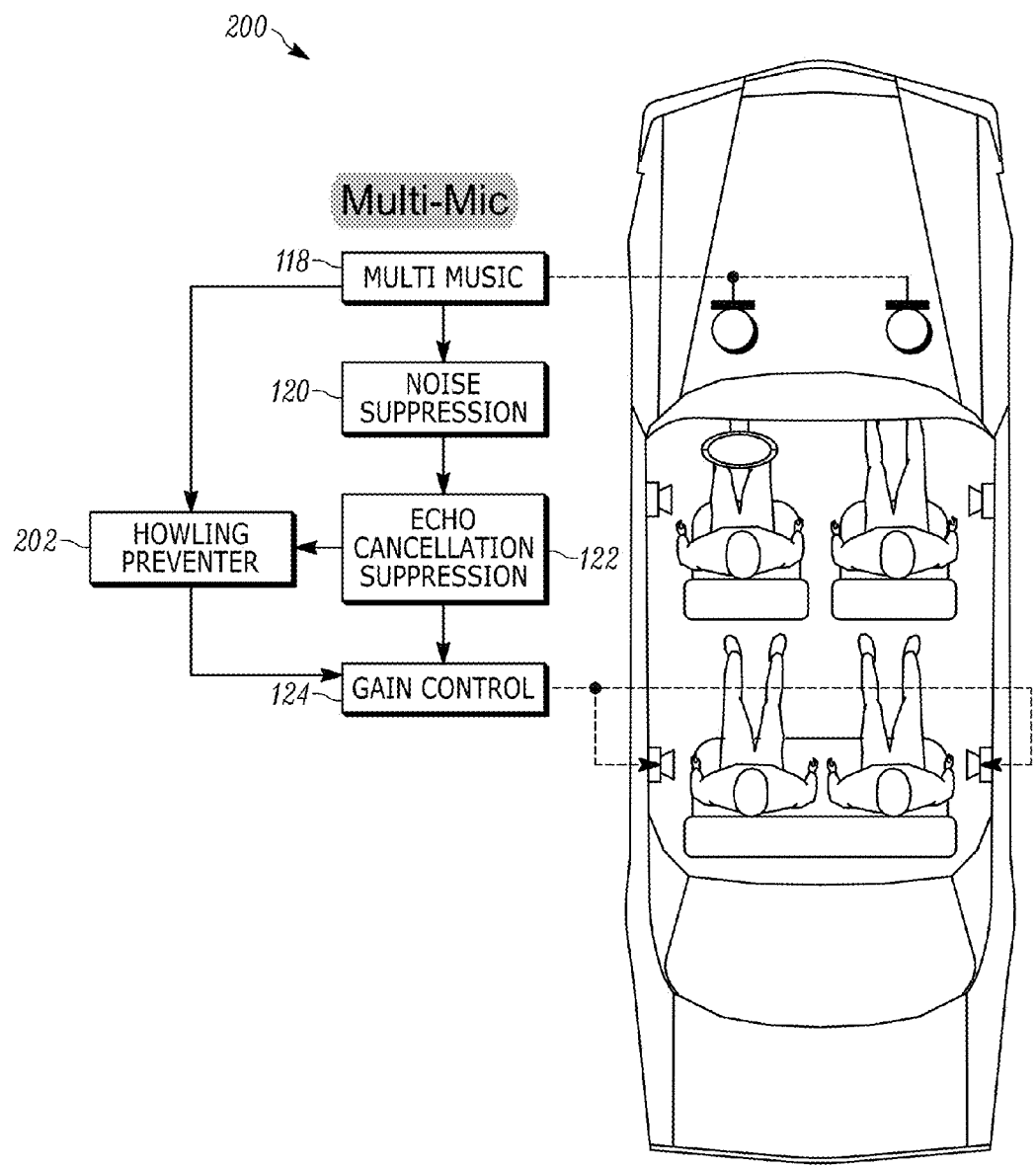
FIG. 2 is a block diagram of an in-vehicle audio communications system with howling prevention.

Referring now to FIG. 2, the in-vehicle communications system 100 shown in FIG. 1 is augmented by a howling preventer 202. Put simply, the howling preventer 202 detects howling conditions and adjusts the amplification or gain of an in-vehicle communications system, to prevent howling before howling begins to occur. Preventing howling is unlike prior art howling suppressors, which reduce gain after howling has started.

Figure 3:
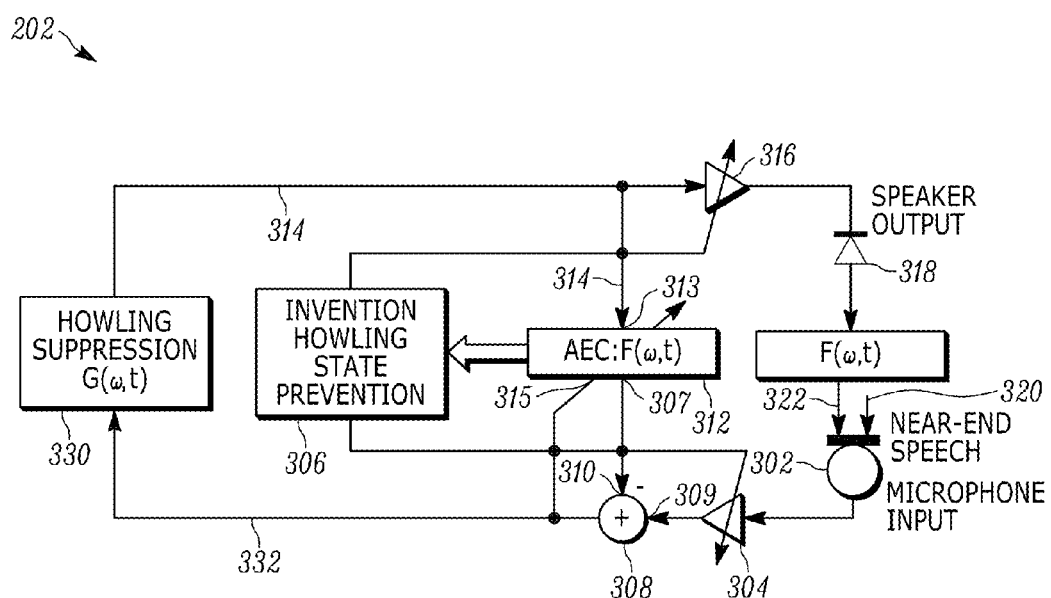
FIG. 3 is a block diagram of a device which attenuates all audio frequencies responsive to changes in the acoustic characteristics of the vehicle and fluctuations in the loop gain of the system shown in FIG. 2.

As shown in FIG. 3, the howling preventer 202 uses components and functionality of a prior art howling suppressor and an echo canceller in order to attenuate or reduce amplification of all audio signals so that howling does not even begin. The howling preventer 202 comprises at least one in-vehicle microphone 302, which detects audio frequency signals inside the vehicle's passenger compartment 104. The microphones can be positioned anywhere in the vehicle's interior but are preferably positioned in front of each passenger.

The signals output from the microphone 302 are provided to an amplifier 304, the gain or attenuation of which is controlled by a howling state prevention processor 306. The amplifier 304 provides an amplified copy of the signals it receives from the microphone to one of two inputs 309 of a conventional, two-input subtractor 308. The second input 310 of the subtractor 308 is coupled to the output 307 of a conventional or prior art echo canceller 312.

The echo canceller 312 has two "inputs," 313, 315, one of which is the signal 314 provided to an output amplifier 316 for an in-vehicle speaker 318. That "first" input 314 to the echo canceller 312 includes both the near-speech 320 of a passenger and acoustic noise or ambient signals 322 detected inside the vehicle passenger compartment 104.

The echo canceller 312 essentially detects audio signals provided to the speaker 318 and which were detected by the microphone, by subtracting from the microphone output 322, audio signals provided to the speaker output by the second amplifier 316. The difference signal, i.e., the output of the subtractor, is provided to both the echo canceller 312 and to the "howling state suppressor" 306.

As is known, howling or oscillation in a closed loop feedback system typically occurs at a single frequency that is preferentially amplified by the system. Stated another way, when the gain provided to a particular frequency signal by a closed loop system is greater than unity, the closed loop system will continue to increase the magnitude of that signal thus causing the system to emit an offensively-loud sound commonly referred to as "howling."

The howling state preventer 306 is preferably embodied as a processor, coupled to the echo canceller 312. The howling state preventer 306 controls the gain or attenuation of the first amplifier 304 responsive to the rate at which audio signals output from the speaker 318 increase as a function of time. When an audio signal's rate of increase is determined to be too fast, howling, of that signal, is considered to be imminent; gain of the amplifier 304 is reduced essentially in real time.

A howling suppressor 330, receives an audio signal 332, which is the audio signal "picked up" by the microphone 302, minus a portion of the audio signals 314 provided to the vehicle's loud speakers 318. The howling suppressor 330 reduces the gain of a frequency or band of frequencies, the gain of which exceeds at least unity, as happens when howling is occurring. The howling suppressor 330 thus acts to suppress or stop howling, after it has begun.

In FIG. 2 and FIG. 3, the acoustic characteristics of the vehicle's interior are represented by a polynomial identified by reference numeral 312. The echo canceller 312 essentially determines acoustic characteristics of the vehicle's interior, in the frequency domain. The echo canceller 312 thus provides a model of the feedback loop comprising the vehicle's interior, the amplifiers 304 and 316 and the signals rounded through the howling suppressor 326.

In the preferred embodiment, howling is considered to be imminent when the magnitudes of audio signals of a particular frequency or in a range of frequencies increase at a rate above a predetermined threshold. The predetermined threshold is a design choice but in any case, it is a rate of increase indicating that the loop gain for a frequency or band of frequencies is approaching one, equal to one or greater than one, a condition which is necessary to sustain oscillation.

Unlike the prior art howling suppressor 306, which selectively reduces the gain of a single frequency or a narrow band of frequencies, the howling state preventer is configured to reduce the audio gain for all frequencies when the closed-loop gain (amplification) of just a single frequency increases at a rate above the threshold at which oscillation is considered imminent and for the gain factor of that frequency equals unity or exceeds unity. The gain or feedback provided to the audio signals in the vehicle will of course be dependent at least in part on acoustic conditions inside the vehicle. Change in the vehicle's acoustic characteristics will thus change the system's susceptibility to howling and affect the attenuation or gain needed to be applied to the system in order to prevent howling.

Figure 4:
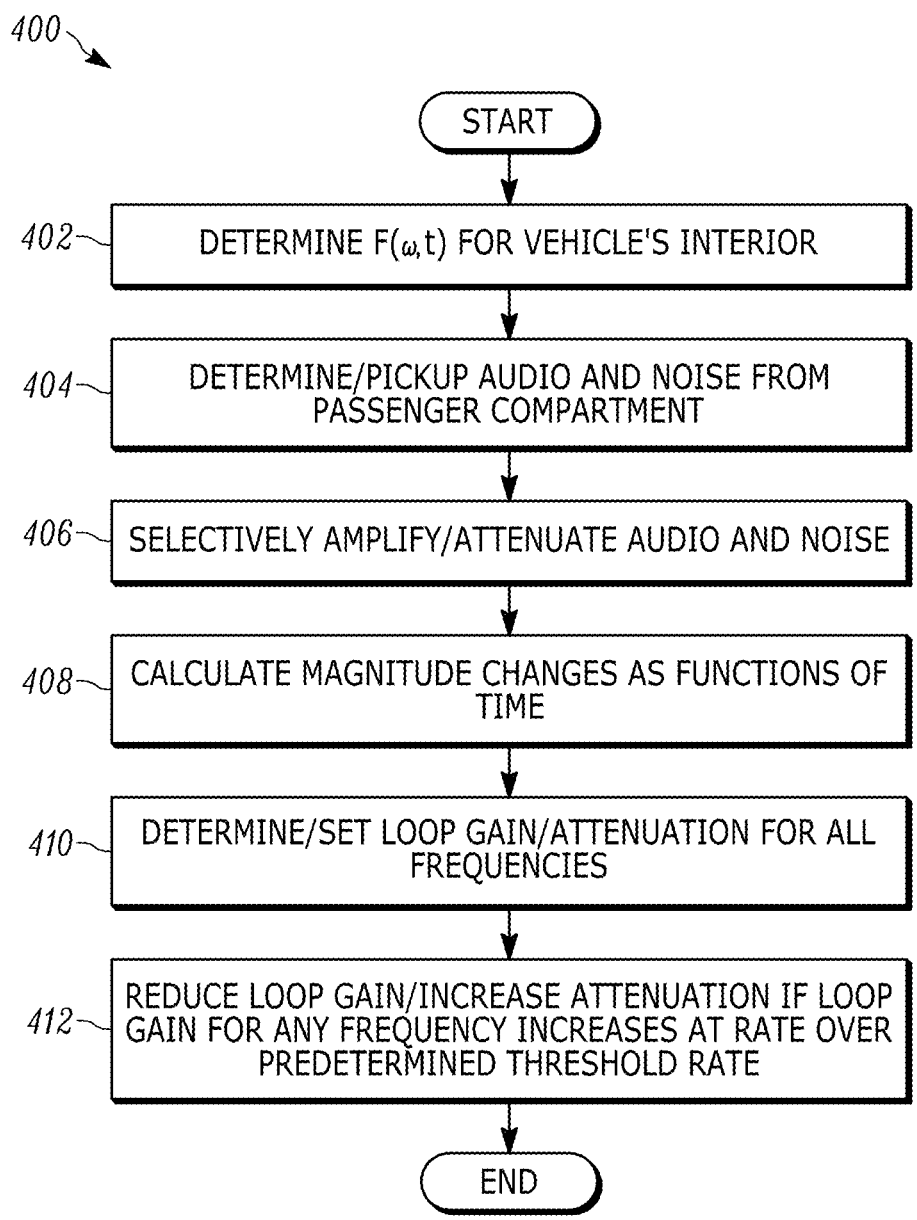
FIG. 4 is a flowchart depicting steps of a method for preventing howling in an in-vehicle audio communications system.

Unlike prior art howling suppressors, the apparatus shown in FIG. 3 and the method shown in FIG. 4 adjust the loop gain responsive to a change in the acoustic characteristics of the vehicle's interior. Those acoustic characteristics are determined by the echo canceller 312. Adjusting the loop gain responsive to acoustic characteristics substantially continuously by the echo canceller precludes the possibility of howling even beginning and improves audio fidelity over that which was possible using the prior art method of suppressing howling at a particular narrow frequency or frequency band.

Referring now to FIG. 4, a method of preventing in-vehicle audio communication system howling can be used in audio communications systems that comprise a feedback loop which itself is comprised of an audio amplifier that receives signals from a microphone and output amplified versions of that audio to in-vehicle loudspeakers. The loudspeakers and microphone are thus coupled to each other through the vehicle's interior which determines the frequency or frequencies at which oscillation or howling can occur.

In a first step 402, a frequency-domain model of the vehicle's acoustic characteristics is determined for each frequency band of a plurality frequency bands. Determining such a frequency-domain model enables changes in the acoustic coupling between the loudspeaker and microphone to be determined in substantially real time. (As used herein, the term "real time" refers to the actual time at which something takes place or occurs.)

At a second step 404, audio frequency signals in the vehicle are detected or transduced from audio to electrical signals by a microphone. At a third step 406, the detected audio signals are amplified by a gain-adjustable amplifier. At a fourth step 408, the magnitudes of the audio signals detected by the microphone and their rates of change in particular frequency bands are monitored. At the fifth 410 step, the loop gain for each of the plurality of different frequencies is determined.

Those of ordinary skill in the art should recognize that the loop gain for different frequencies or bands of frequencies will change responsive to acoustic characteristics of the vehicle. Stated another way, different frequencies output by the microphone will be detected differently by the microphone, increasing or decreasing the likelihood that a particular frequency or band of frequencies will be preferably amplified and thus lead to howling.

At the final step 412, the loop gain of the system is reduced for all audio frequencies responsive to a determination that the loop gain for any audio frequency band increases at a rate above a predetermined threshold or before the loop gain for any band of frequencies or signal frequency equals or exceeds unity. The method thus prevents conditions that give rise to a howling condition from existing.

In the preferred embodiment, monitoring the vehicle's acoustic characteristics continuously and providing a frequency domain model thereof is preferably performed by a prior art echo canceller and a frequency-specific howling suppressor. And, in the preferred embodiment, the apparatus depicted in FIG. 3 is embodied as a processor coupled to a memory which stores executable instructions. When those instructions are executed, they cause the processor to perform the steps shown by the method of FIG. 4.

The foregoing description is for purposes of illustration only. The true scope of the invention is set forth in the following claims.

What is claimed is:

1. A method of preventing an in-vehicle audio communication system from howling, the in-vehicle audio communications system comprising an audio feedback loop, the loop comprising an in-vehicle microphone that detects in-vehicle sounds, an audio amplifier that receives signals from the microphone, and, a loudspeaker coupled to the audio amplifier and which transduces audio frequency signals from the amplifier into sound that is output into the vehicle, the signals from the loudspeaker being acoustically coupled to the microphone through the vehicle's interior, the amplifier having a changeable gain factor by which the audio signals from the microphone are amplified or suppressed, then output to the loudspeaker, the method comprising:
   determining a frequency-domain model of acoustic characteristics of the vehicle's interior, for a plurality of different audio frequency bands in order to detect changes in acoustic coupling between the loudspeaker and microphone in substantially real time;
   detecting audio frequency acoustic signals in the vehicle by the microphone;
   amplifying the detected audio frequency signals;
   monitoring magnitudes of audio signals detected by the microphone, in predetermined frequency bands of audio signals, and which were output from the loudspeaker;
   determining a loop gain for each of the plurality of different frequency bands;
   decreasing the loop gain of the audio amplifier for all audio frequencies, responsive to a determination that the loop gain for an audio frequency band increases a rate at above a predetermined threshold and before the gain factor equals or exceeds unity.

2. The method of claim 1, further comprising the step of adjusting the loop gain responsive to a change in the acoustic characteristics of the vehicle's interior.

3. The method of claim 1, wherein the step of monitoring acoustic characteristics of the vehicle's interior substantially continuously and providing a frequency-domain model of acoustic characteristics of the interior is performed by an echo canceller and a frequency-spectrum specific howling suppressor.

4. The method of claim 1, further comprising the step of suppressing detected howling, the howling suppression comprising a selective decrease in the loop gain for an audio frequency band at which the howling occurs.

5. An apparatus for preventing an in-vehicle audio communication system from howling, the apparatus comprising:
    an in-vehicle microphone that detects in-vehicle sounds;
    an audio amplifier coupled to the microphone and which receives signals from the microphone, the amplifier having a changeable gain factor by which the audio signals from the microphone are amplified or suppressed;
    a loudspeaker coupled to an output of the audio amplifier, the loudspeaker transducing audio frequency signals from the amplifier into sound that is output into the vehicle, the signals from the loudspeaker being acoustically coupled to the microphone through the vehicle's interior, the microphone, audio amplifier and loudspeaker comprising an audio frequency loop having a loop gain;
    an echo canceller, coupled to the audio amplifier and to the microphone, the echo canceller providing a frequency-domain model of acoustic characteristics of the vehicle's interior, for a plurality of different audio frequency bands;
    a loop gain determiner coupled to the echo canceller, the audio amplifier, the microphone and the loudspeaker, the loop gain determiner configured to reduce the gain of the audio amplifier responsive to a determination that the loop gain of the audio frequency loop increases at a rate greater than a predetermined threshold and prior to the loop gain being equal to or greater than unity.

* * * * *